United States Patent [19]

Kawashima

[11] Patent Number: 4,754,833
[45] Date of Patent: Jul. 5, 1988

[54] COOLING CHAIN DRIVE FOR A MOTORCYCLE HAVING BALLOON TIRE

[75] Inventor: Masahiro Kawashima, Shizuoka, Japan

[73] Assignee: Yamaha Hatsudoki Kabushiki Kaisha, Japan

[21] Appl. No.: 923,009

[22] Filed: Oct. 24, 1986

Related U.S. Application Data

[62] Division of Ser. No. 665,782, Oct. 29, 1984, Pat. No. 4,645,028.

[51] Int. Cl.⁴ .............................................. B60K 11/06
[52] U.S. Cl. .................................... 180/219; 180/227; 474/93; 474/144
[58] Field of Search ............... 180/218, 219, 227, 229, 180/231, 68.1, 68.2, 72; 280/289 D, 289 G; 474/93, 144, 146

[56] References Cited

U.S. PATENT DOCUMENTS

| 4,039,200 | 8/1977 | McGonegle | 180/227 |
| 4,493,677 | 1/1985 | Ikenoya | 474/93 |
| 4,497,285 | 2/1985 | Kondo | 180/229 |
| 4,531,928 | 7/1985 | Ikenoya | 474/146 |
| 4,621,680 | 11/1986 | Funabashi | 180/229 |
| 4,631,977 | 12/1986 | Kawashima | 474/93 |

FOREIGN PATENT DOCUMENTS

| 585732 | 3/1925 | France | 180/229 |
| 413744 | 5/1946 | Italy | 180/227 |
| 1448671 | 9/1976 | United Kingdom | 180/231 |

Primary Examiner—John J. Love
Assistant Examiner—Everett G. Diederiks, Jr.
Attorney, Agent, or Firm—Ernest A. Beutler

[57] ABSTRACT

A suspension and drive arrangement for an off the road motorcycle having a balloon tired rear wheel. The rear wheel is suspended for movement relative to the frame by a Y-shape trailing arm and a pair of vertically extending suspension elements are interposed between the trailing arm and the frame for cushioning shock transmitted to the rear wheel. The rear wheel is driven by a chain drive including a first chain that drives an intermediate shaft and a second chain which drives the rear wheel from the intermediate shaft. The first chain is positioned inwardly of the second chain and a pair of embodiments illustrate devices for cooling the first chain. In one embodiment, the chain is cooled purely by ram air whereas the other embodiment provides cooling with both ram air and forced air flow.

2 Claims, 4 Drawing Sheets

COOLING CHAIN DRIVE FOR A MOTORCYCLE HAVING BALLOON TIRE

This is a division of U.S. patent application Ser. No. 665,782, filed Oct. 29, 1984 now U.S. Pat. No. 4,645,028.

BACKGROUND OF THE INVENTION

This invention relates to a motorcycle having balloon tires and more particularly to an improved suspension and drive arrangement for an off the road motorcycle.

Off the road vehicles are becoming extremely popular. Such vehicles employ large balloon tires of the low pressure type that permit them to travel over a wide variety of terrains. The application of such wheels and tires has been made to motorcycles as well as three and four wheel vehicles. With a motorcycle, there are certain advantages to providing an additional suspension system in addition to the balloon tire. However, because the tire is normally wider than the width of the frame of the motorcycle, it is difficult to provide an effective suspension system that is capable of sustaining the loads encountered in off the road use.

It is, therefore, a principal object of this invention to provide an improved suspension system for motorcycles having balloon tires.

It is a yet further object of this invention to provide a suspension system for a motorcycle having balloon tires that permits a high degree of force absorption.

Because of the large width of the balloon tire, the driving of the rear wheel of a motorcycle equipped with such tires presents certain problems. That is, the driving chain for the rear wheel will be positioned transversely outwardly of the frame and thus the chain may be exposed in an area where it could be damaged. Furthermore, if the chain extends all the way forward to the engine, it will be in a position where it might interfere with the rider's legs. Therefore, it has been proposed to employ a dual chain system for driving the rear wheels of motorcycles embodying balloon tires. A first chain extends from the engine to an intermediate shaft that is mounted directly in front of the rear wheel. The intermediate shaft, in turn, drives the rear wheel through a second chain that is spaced transversely outwardly from the frame whereas the first chain is positioned inwardly of the frame. However, due to the high driving loads that the first chain encounters and its inward placement, there is a danger that it could become damaged due to overheating.

It is, therefore, a further object of this invention to provide an improved drive arrangement for motorcycles embodying balloon tires.

It is a yet further object of this invention to provide a driving chain arrangement for vehicles wherein the chain is protected by an encompassing member and wherein an arrangement is provided for cooling the chain so as to prevent damage from overheating.

SUMMARY OF THE INVENTION

A first feature of this invention is adapted to be embodied in a suspension system for an off the road motorcycle having frame means and a balloon tired rear wheel having a width at least equal to the width of the frame means. Suspension arm means are pivotally supported at one end on the frame means and have a pair of rearwardly extending arm members each extending on one side of the rear wheel and journaling the rear wheel. A pair of suspension elements are provided and each is interposed between the means and the frame means for cushioning the movement of the rear wheel relative to the frame means.

Another feature of the invention is adapted to be used in an off the road vehicle having frame means and an engine carried by the frame means and having an output shaft. At least one rear wheel is carried by the frame means and chain drive means are provided for driving the rear wheel from the engine output shaft. Means direct a flow of cooling air over at least a portion of the chain drive means.

DETAILED DESCRIPTION OF THE PREFERRED EMBODIMENTS

Figure 1:
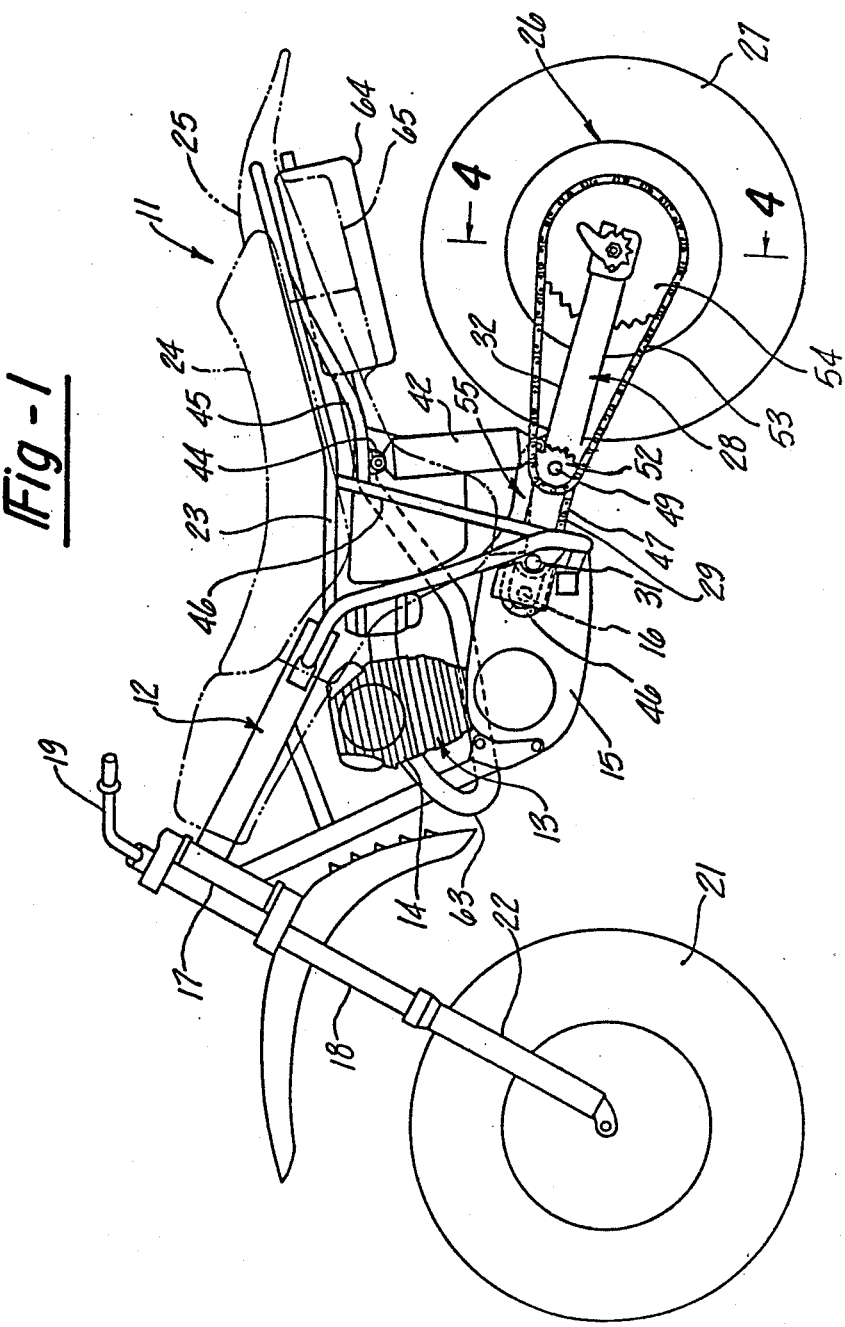
FIG. 1 is a side elevational view of an off the road motorcycle constructed in accordance with an embodiment of the invention, with portions shown in phantom.
Figure 2:
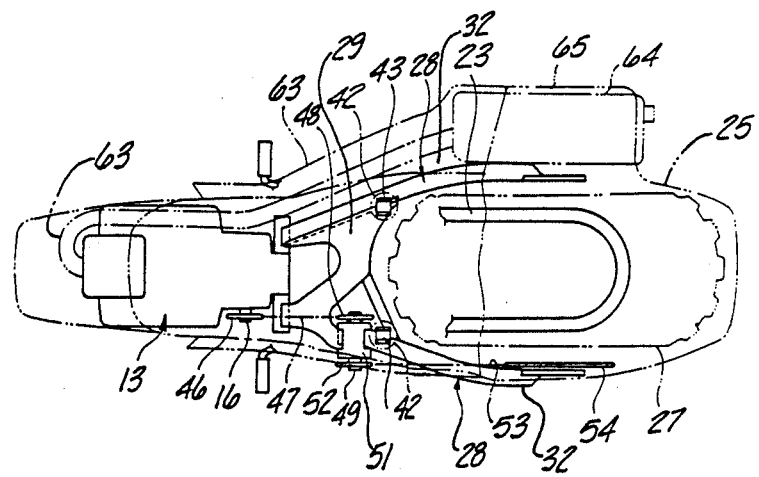
FIG. 2 is a reduced scale top plan view of the motorcycle, with portions shown in phantom.
Figure 3:
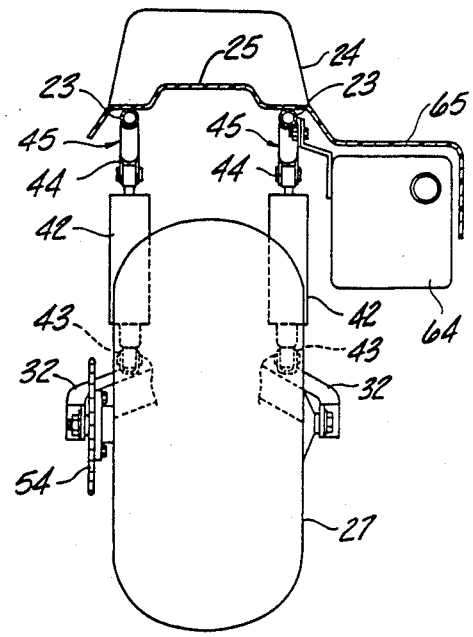
FIG. 3 is an enlarged rear elevational view of the motorcycle, with a portion broken away.

Referring first primarily to FIGS. 1 through 4, an off the road motorcycle constructed in accordance with an embodiment of the invention is identified generally by the reference numeral 11. The motorcycle 11 includes a frame assembly, which may be of any type and is depicted as being of a welded tubular construction, indicated generally by the reference numeral 12. The frame assembly 12 supports a combined engine transmission assembly, indicated generally by the reference numeral 13, that consists of a reciprocating type single cylinder engine 14 and a combined crankcase transmission assembly 15 that drives an output shaft 16. It is to be understood that the type of engine and transmission assembly employed may vary with departing from the invention.

The frame assembly 12 includes a head tube 17 that supports a front fork assembly 18 for steering movement under the control of a handlebar assembly 19. A front wheel 21 is supported by the front fork assembly 18 by a means that may include suspension elements of the tubular type 22.

The frame assembly 12 further includes a U-shaped seat rail 23 on which a seat 24 is supported. A combined body and fender assembly, shown in phantom in some of the views and identified by the reference numeral 25, may be interposed between the seat 24 and the seat rails 23.

A rear wheel, indicated generally by the reference numeral 26 and carrying a low pressure balloon tire 27, is positioned at least in part beneath the seat 24. As may be readily apparent from FIG. 2, the balloon tire 27 and rear wheel 26 have a width that is substantially greater than the width of the main portion of the frame assembly 12. The rear wheel 26 and mounted tire 27 are supported for suspension movement relative to the frame assembly 12 by means of a trailing arm assembly and suspension system constructed in accordance with an embodiment of the invention and identified generally by the reference numeral 28. The trailing arm assembly 28 is of the fabricated type and includes a forward box section element 29 that is pivotally supported at its forward end of the frame assembly 12 by means of a pivot pin 31. Extending rearwardly from the forward portion 29 and integrally connected to it are a pair of transversely spaced apart arm members 32. As a result, the trailing arm assembly 28 has a generally Y-shape when viewed in top plan.

Figure 4:
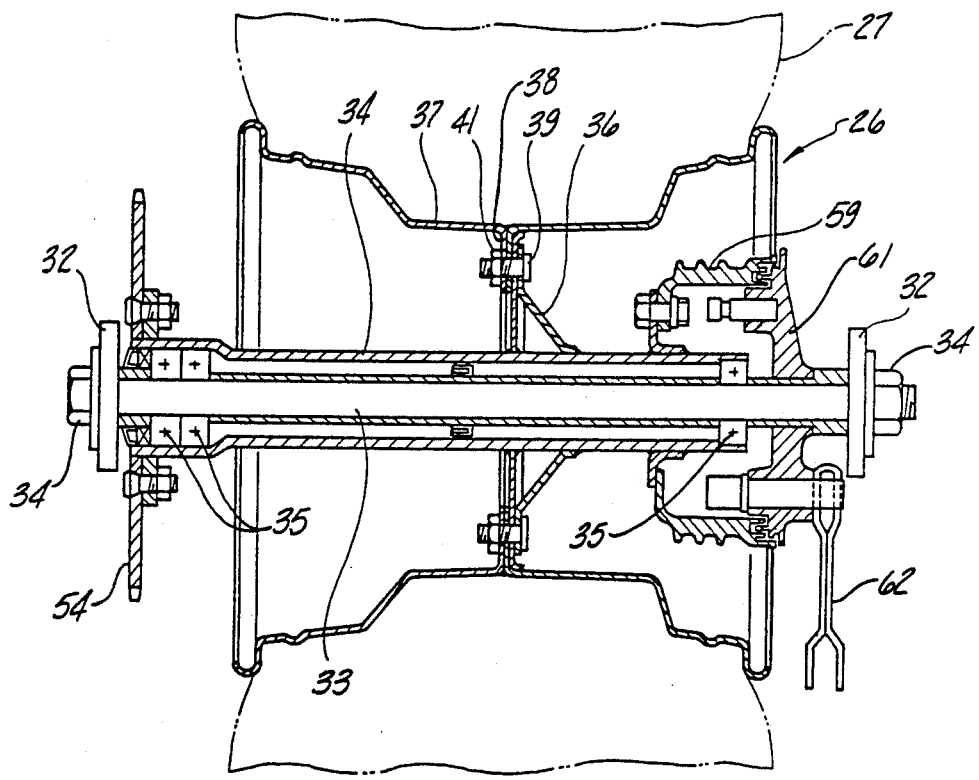
FIG. 4 is a cross-sectional view taken along the line 4—4 in FIG. 1.

The rear wheel 26 and tire assembly 27 are journaled at the rear ends of the arm members 32 by a construction as best shown in FIG. 4. This construction includes a non-rotating axle 33 that is detachably connected to the arm members 32 by means including nuts 34. Rotatably journaled on the non-rotating axle 33 is an axle tube 34 which is formed as a part of the wheel 26. The axle tube 34 is journaled on the non-rotating axle 33 by means including anti-friction bearings 35. A wheel center 36 is fixed, as by welding, to the axle tube 34 and extends radially outwardly therefrom. A rim portion 37 having a drop center is provided with an inwardly extending flange 38 that is affixed to the center 36 by a series of bolts and nuts 41. The tire 27 is mounted on the rim 37 in a known manner.

Because the motorcycle 11 is designed for off the road use, it is desirable to provide a robust suspension system for the rear wheel 26. However, the use of such wide balloon tires as the tire 27 has, heretofore, made it difficult to employ more than one suspension element for such vehicles. In accordance with the invention, however, the rear wheel 27 and supported tire 28 are suspended for suspension movement relative to the frame 12 by means of a pair of suspension elements 42. Each suspension element 42 consists of a combined hydraulic shock absorber and coil compression spring. Each suspension element 42 is loaded by means of a pivotal connection to a respective bracket 43 that is affixed to the trailing arm assembly 28 at or close to the point where the front member 29 is joined to the arm members 32. The upper ends of the suspension elements 42 are pivotally connected to brackets 44 which are, in turn, affixed to back stays 45 of the frame assembly 12. The back stays 45 are affixed, as by welding, to seat pillars rails 46 and the brackets 45 are juxtaposed to the connection between the back stays 45 and the seat pillar rails 46.

Because of the large width of the rear wheel 26 and its mounted balloon tire 27, it is difficult to provide an adequate driving arrangement for the rear wheel 26 that will not encroach upon the rider's leg room. In accordance with the invention, however, an improved drive arrangement is provided that facilitates driving of the rear wheel 26 without encroaching on the rider's foot space. This driving arrangement includes a driving sprocket 46 that is affixed to one side of the transmission output shaft 16 and which is disposed laterally within the frame assembly 12. A primary driving chain 47 encircles this sprocket and an intermediate sprocket 48 that is affixed to an idler shaft 49 which is journaled on the trailing arm assembly 28 and specifically upon its portion 29. This supporting arrangement includes a bracket assembly 51 that contains suitable anti-friction bearings.

The shaft 49 extends through the bracket assembly 51 and has a further sprocket 52 affixed to its outward end. The sprocket 52 is positioned transversely outside of the frame assembly 12 and specifically at a point spaced transversely outside of the balloon tire 27. A final driving chain 53 encircles the sprocket 52 and a sprocket 54 that is affixed to the rear wheel axle portion 34. Hence, the drive will be transmitted to the rear wheel through the chains 47 and 53.

Figure 5:
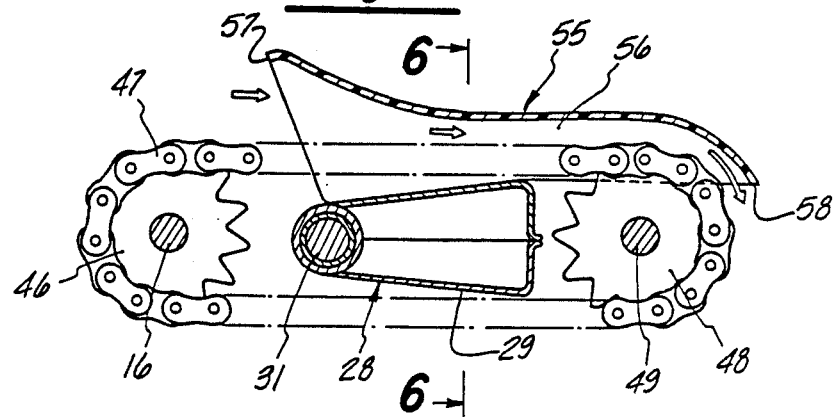
FIG. 5 is an enlarged cross-sectional view showing the primary driving chain.
Figure 6:
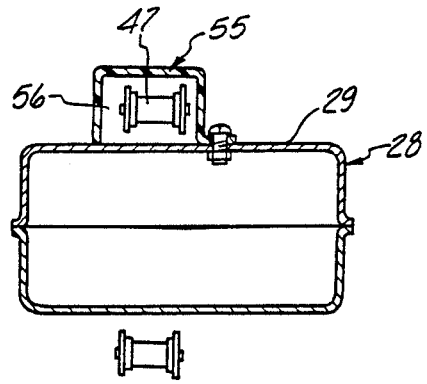
FIG. 6 is a cross-sectional view taken along the line 6—6 of FIG. 5.

The staggered placement of the driving chains 47 and 53 permits an effective drive for the rear wheel 26 while at the same time keeping the area where the rider's legs are free from encroachment by the chain drive. However, the inboard placement of the primary driving chain 47 places it in an area where it cannot be cooled by the normal air flow. Furthermore, since all of the driving load takes place through this relatively short length chain, it may tend to be overheated. Therefore, in accordance with the invention, a shroud, indicated generally by the reference numeral 55 and shown in most detail in FIGS. 5 and 6 is provided that encompasses a portion of the length of the chain 47 and which extends at least in part over the idler shaft sprocket 48. The shroud 55 defines an air space 56 that is adapted to receive ram air through a forwardly facing opening 57 and cause it to circulate across the chain 47. The ram air is directly downwardly and outwardly through an outlet opening 58 that is formed in proximity to the idler shaft sprocket 48. As a result, when the motorcycle 11 is being ridden, ram air will follow the air path shown by the arrows in FIG. 5 and cool the chain 47.

Referring to FIG. 4, the rear wheel axle portion 34 carries an integral brake drum 59 that cooperates with a backing plate 61 that is fixed to the non-rotating axle 33 and which carries a pair of brake shoes (not shown) that are actuated by means of a lever 62 for stopping the motorcycle 11. The operating lever 62 is actuated in any suitable manner.

The engine 14 has an exhaust pipe 63 (FIGS. 1 and 2) that extends from the forward portion of the engine and then bends rearwardly to run along one side of the motorcycle 11 where it terminates in a muffler 64 that is positioned above and to one side of the rear wheel 26. The muffler 64 is covered by an extending portion 65 of the body 25 so as to protect and shield the rider from the heat from the muffler 64 and exhaust system.

Figure 7:
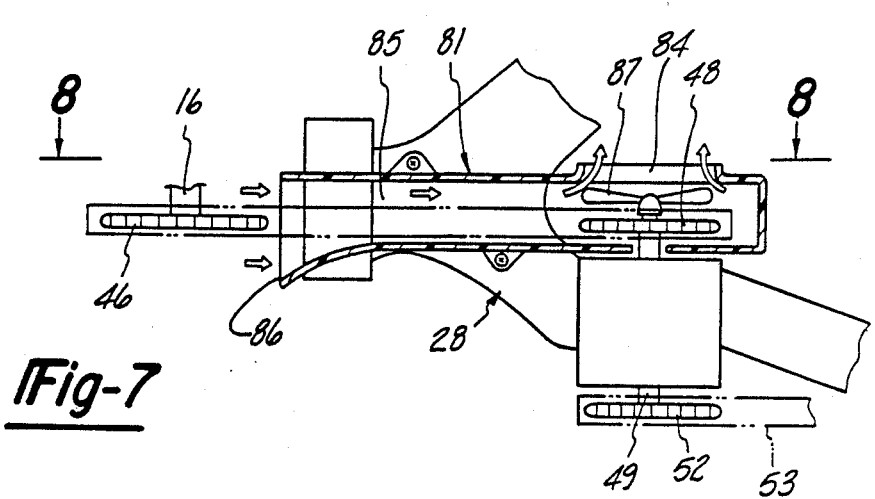
FIG. 7 is a top plan view, with a portion broken away, showing the primary drive chain arrangement constructed in accordance with another embodiment of the invention.
Figure 8:
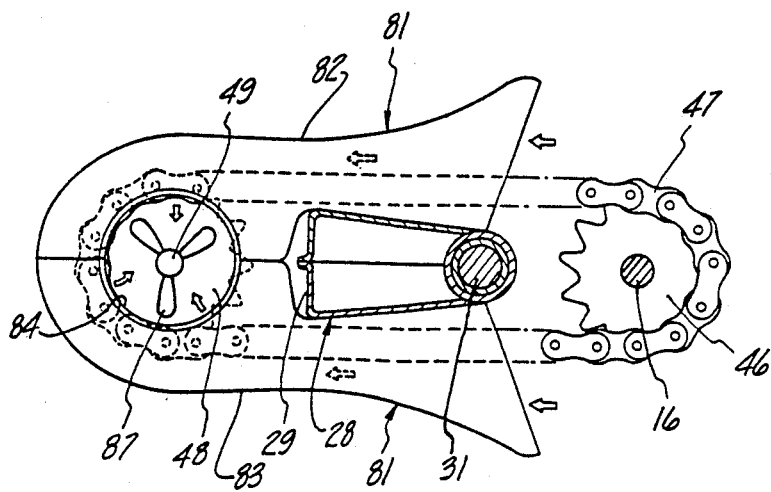
FIG. 8 is a cross-sectional view taken along the line 8—8 of FIG. 7.

In the embodiment of FIGS. 1 through 6 as thus far described, the primary driving chain 47 was cooled by forced air cooling. In addition, only the top portion of the chain 29 was cooled in that embodiment. FIGS. 7 and 8 show another embodiment of the invention wherein both the upper and lower flights of the chain 26 are cooled and wherein a forced cooling arrangement is provided. In accordance with this embodiment, a shroud assembly, indicated generally by the reference numeral 81 is provided. The shroud assembly 81 includes an upper half 82 and a lower half 83 that are joined together in a suitable manner and which are carried by the trailing arm portion 29. The shroud 81 is formed with a sidewardly directly air outlet opening 84 that is juxtaposed to the idler shaft 49 and the sprocket 48. The shroud 81, however, encircles the periphery of this sprocket.

The shroud 81 defines an air path 85 that extends around the major portion of the length of the chain 47 and which provides a forwardly facing inlet opening 86 so that ram air can enter the cavity 45 for discharge through the opening 84. In addition, a fan 87 is affixed for rotation with the idler shaft 49 and is directed so as to cause air flow to be drawn through the air passage 85 from the inlet 86 for discharge through the opening 84. Hence, there is a further degree of cooling permitted with this embodiment due to the forced air flow that does not require ram air for cooling.

It should be readily apparent from the foregoing description that an improved robust suspension arrangement is provided for off the road motorcycles and, furthermore, a very effective yet compact arrangement is provided for cooling a driving chain even though it may be located an inboard position. Although two embodiments of the invention have been illustrated and described, various changes and modifications may be made without departing from the spirit and scope of the invention, as defined by the appended claims.

I claim:

1. A drive system for an off the road vehicle or the like comprising frame means, an engine carried by said frame means and having an output shaft, at least one rear wheel carried by said frame means, chain means for driving said rear wheel from said engine output shaft, said chain means comprising a first chain driven by said engine and driving an intermediate shaft and a second chain driven by said intermediate shaft driving said rear wheel, the first chain being positioned closer to the vehicle center line than the second chain, said second chain being exposed to the path of air as said vehicle is being driven, and shroud means at least partially enclosing said first chain, said shroud means having a ram air inlet for forcing air across said first chain as the vehicle is being driven and fan means driven by said first chain for directing a flow of cooling air through said shroud means and over said first chain.

2. A drive system as set forth in claim 1 wherein the fan means is driven by the intermediate shaft and is disposed adjacent a discharge opening in the shroud means for discharging cooling air from said shroud means.

* * * * *